Nov. 23, 1954 W. JOHNSON 2,695,331
SYSTEM FOR STABILIZING REPRODUCERS OF TELEVISION SIGNALS
Filed Feb. 18, 1952
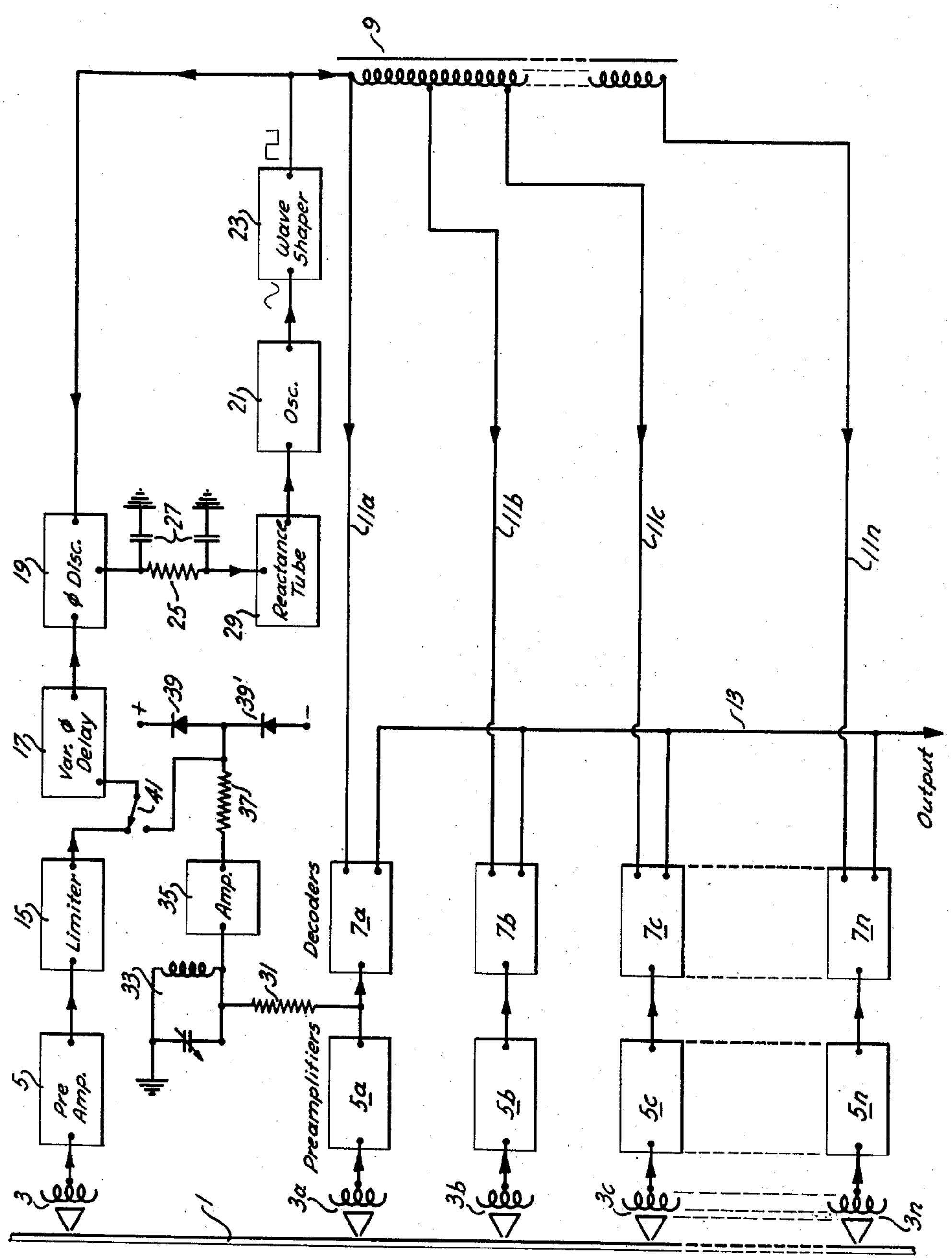
INVENTOR.
WAYNE JOHNSON
BY Lippincott & Smith
ATTORNEYS United States Patent Office 2,695,331 Patented Nov. 23, 1954

2,695,331

SYSTEM FOR STABILIZING REPRODUCERS OF TELEVISION SIGNALS

Wayne Johnson, Los Angeles, Calif., assignor to John T. Mullin, Los Angeles, Calif.

Application February 18, 1952, Serial No. 272,085

3 Claims. (Cl. 178—6.6)

This invention relates to equipment for reproducing television signals from phonograph-type records. This application is directed primarily to the reproduction of signals as recorded by a system which is broadly that described in a co-pending application of John T. Mullin, Serial No. 195,612, filed November 11, 1950, entitled "System for Recording and Reproducing Television Signals." Certain modifications of the system there disclosed are described in a concurrently filed application of the present applicant entitled "Television Signal Reproducing System," Serial No. 272,083, the present invention being described but not claimed in the latter application.

In accordance with the system to which this invention specifically applies, a timing wave is generated at a frequency of a lower order of magnitude than the highest frequencies required in the reproduced signals. From this timing wave there are derived a plurality of trains of short pulses of like frequency but mutually displaced in phase or timing by successive increments substantially equal to one-half cycle of the highest frequency component which is to be included in the reproduced signal. Each of these pulse trains is modulated by the original signal, with the result that, considering any one pulse train, successive crests are modulated by non-successive samples of the original wave, successive samples being modulated consecutively onto different pulse trains. All of the pulse trains are recorded simultaneously on a phonographic type track, these tracks being arranged in parallel on a suitable recording medium. Preferably this medium is a magnetic tape but the system is also applicable to photographic type records on film. The original timing wave may also be recorded upon the medium as an additional track, but this is not a necessary feature of the system.

Within certain limitations of frequency and record speed it is possible to record each train of waves so that it will be reproduced as flat topped pulses; in order to record the maximum amount of information at the minimum record speed, however, it is more feasible, because of frequency limitations in the apparatus itself, to produce a record which, when played back, regenerates each half-cycle of the wave in sinusoidal form; i. e., the trains are recorded, not as discrete pulses of, say, ⅛ microsecond duration, but as continuous modulated wave trains of timing-wave frequency, the magnitude of each crest being proportional to a corresponding sample of the original signal.

In reproduction the record is played back in the usual manner to produce a concurrent plurality of wave trains. An unmodulated wave of the timing frequency is also recovered from the record, either from a separately recorded track or by filtering the modulation components out of one of the signal waves to produce a substantially constant amplitude wave of the timing frequency. From this constant amplitude wave there are derived a new plurality of pulse trains having the same relative phase dsiplacements as those used in sampling the original signal. Each of these pulse trains is again modulated by potentials derived from the crests of the corresponding reproduced waves. All of this new set of modulated pulse trains are combined in a common output circuit, and because of their relative displacements there results a continuous, substantially uniform train of pulses which substantially reconstitute the original signal.

In order to accomplish the latter results it is necessary that the reproduced modulated wave trains have, in effect, the same relative phases as the original modulated pulse trains. As played back, however, the phases depend not only upon the phases of the recorded waves but also upon the relative positions of the translating heads used in recording and in reproducing them, where the reproduced waves are of sinusoidal form, each train must be sampled within 25 electrical degrees or less of its crest value to give an even fairly satisfactory reproduction.

In constructing the system described in the concurrently filed application, a record speed of 100 inches per second has been tentatively adopted as a standard, and a timing wave frequency of approximately 165 kc. per second has been adopted. To meet the plus-or-minus 25 electrical degrees of the tentative standard, both the recording and reproducing heads must be alined within plus or minus 20 millionths of an inch of their desired relative positions, a precision which is substantially unattainable. In order to increase the tolerances, there is shown, in the concurrently filed application above mentioned, a system wherein the crest potentials of the modulated waves, representing the values of the samples of the signal originally taken, are stored as electrical charges. These charges are then used to modulate the new series of pulse trains. Since it is the stored crest values that are sampled, instead of the waves themselves, the sampling can occur at any time between the instant at which the storing of a charge is complete and the instant at which the storage of the next charge begins. By providing a plurality of storage condensers for each track the interval during which sampling may occur may be extended for substantially a full cycle of the timing wave frequency (as contrasted with fifty degrees or less of the 360 representing the cycle) or even to a plurality of cycles. This increases the permissible tolerance in alinment of the heads by a factor of approximately seven, without the compromise in the quality of signals that even the small tolerance originally mentioned entails.

Another improvement which the storage system permits is that to which the present invention relates directly. All record driving mechanisms are subject to some variations in speed. Known methods of control substantially eliminate gross variations and the average speed of the record can be controlled to a very precise degree. Some residual variation inevitably remains. The residual variation, with proper drive mechanisms, is very minute and is usually at rather high frequencies; perhaps of the order of magnitude of the upper auditory limit or somewhat above. These variations may be referred to as "flutter": in character they vary with the specific type of drive used and it is frequently difficult to determine their exact origin. Thus apparent variations in tape speed of the order of magnitude and frequency here considered may not actually be due to changes in the overall longitudinal speed but the effect may be produced by transverse vibrations of the tape which effectively change the speed of that portion of the tape at the head itself.

If the phase-displaced pulse trains are derived directly from one of the tracks recorded on the tape or other record, the result may be apparent on a television screen as a peculiar flicker, crawl, or "boiling."

The purpose of the present invention is to eliminate this last effect. In accordance with the invention the final sampling of the pulse charges is accomplished by waves produced by a separate oscillator, tuned to the nominal frequency of the timing wave. The output of this oscillator is compared with the wave of the same average frequency, derived from the record of either the timing wave or one of the modulated waves. Any discrepancy in phase between the two waves compared is used to produce an error signal which is applied to correct the oscillator frequency. The highest frequency components are filtered out of the error signal before its application to correct the oscillator, with the result that the timing wave produced by the oscillator corresponds in average phase with that of the timing wave, but with the effect of flutter eliminated.

If the various modulated wave trains reproduced by the equipment were sampled directly in this manner, instantaneous phase discrepancies between the waves and the pulses used to sample them might result in sampling at points so remote from the crest as to introduce errors even more serious than those attempted to be avoided. The relatively long storage intervals avoid this effect and in the usual case the storing system will be used in connection with the present invention. Nevertheless, there are uses for television signals of relatively low definition; such signals can be recorded so as to be reproduced as flat topped waves which give a reasonable latitude for sampling, and in such instances this invention may be satisfactorily used without employing the storage technique.

The single figure of the drawing is a diagram, largely in block form, illustrating the equipment employed in the present invention. For purposes of explanation, but not by way of limitation, the recording medium 1 is assumed to be a magnetic tape on which the various tracks are impressed as variations in polarization.

The means for driving the record are not shown, since there are available commercial driving equipments which operate with the necessary precision. Engaging the various tracks on the tape are a plurality of translating heads, all of which are substantially identical in construction. Recording head 3 is positioned to engage an unmodulated timing track; heads 3*a*, 3*b*, . . . 3*n*, ranged laterally across the path of the recording medium, engage the various phase-displaced tracks which are modulated by the signals to be reproduced. In the particular equipment described here, as well as in the concurrently filed application, twelve heads would be used to produce a signal having its upper signal frequency components at substantially four megacycles. The relative phase displacement of the recorded waves to produce such a signal is fifteen electrical degrees or substantially ⅛ microsecond; each half cycle of each wave train is modulated by a signal sample.

The modulated wave trains picked up by the heads 3*a* to 3*n* are passed to preamplifiers 5*a* to 5*n*, there amplified and fed to decoders 7*a* to 7*n*. For the details of these decoders reference is made to the concurrently filed application above identified. For the purpose of this application it is sufficient to state that the decoders are supplied from a delay line 9 with waves, successively displaced in phase by fixed increments of ⅛ microsecond by their passage along the delay line, decoder 7*a* receiving the undelayed signal through line 11*a*, decoder 7*b* a signal delayed by the first section of the delay line through lead 11*b*, and so on with each successive decoder up to 7*n*, the signal to which is delayed by $n-1$ times ⅛ microsecond. In each decoder pulses of ⅛ microsecond or less are developed from the wave trains fed to it from the delay line; these pulses are modulated by signals proportioned to the crest values of the waves received from the respective preamplifiers, and the modulated pulses are mixed in a common output circuit 13.

Two modifications of the system for deriving the timing waves are shown. In accordance with the first the timing wave is picked up by head 3 and after amplification by preamplifier 5 is first passed through a limiter 15, which removes any possible residual modulation, and thence to a variable delay circuit 17. This circuit performs a two-fold function; first, assuming that the various other heads are alined upon the timing wave recording head as a norm and that deviations in alinement occur equally on both sides of that norm, it delays the timing wave by an amount equal to one-half of the storage period, so that the sampling will always take place within that period with respect to each of the reproduced waves. Second, if the storage head is not in the median position, a variation in the delay applied will place it there effectively and still give the desired results.

From the variable delay circuit the timing wave is fed to a phase discriminator 19 for comparison with a separately generated wave of the same frequency, supplied by an oscillator 21. The output wave from this oscillator is passed through a wave-shaper 23, which converts the substantially sinusoidal output wave into a rectangular wave form and supplies it both to the delay line 9 and to the phase discriminator 19. Phase discriminators or phase detectors of numerous types are known; in "Electronic Instruments," volume 21, Radiation Laboratory Series, McGraw-Hill, 1948, pages 383–386, eight different circuits are shown for accomplishing the purpose, any one of which may be employed in the present invention, and others could doubtless be devised. In each of the devices there shown the output signal is in the form of a unidirectional voltage (or current), the magnitude of which is proportional to the extent of the phase deviation between the reference wave (in this case the timing wave from the record) and the wave compared to it, and the polarity is dependent upon whether the reference wave leads or lags in phase the wave with which it is compared.

The unidirectional output signal from the phase discriminator is passed through a low pass filter, here indicated as the resistance capacity type comprising a resistor 25, each end of which is connected to ground by a condenser 27. This filter is given a time constant sufficiently long to remove the timing-wave-frequency components. The resulting unidirectional current is then fed to a reactance tube 29. Various methods of using such tubes to control the frequencies of oscillators are known; ordinarily they are connected across the frequency-determining circuit of the oscillator and, as parts of such circuits, vary the effective inductance or capacity of the latter in such sense as to bring the oscillator into phase with the reference wave. This type of control, per se, is well known and hence need not be described here in detail.

Oscillator 21 is preferably tuned as nearly as possible to the nominal frequency of the timing wave, so that it will operate substantially at this frequency with zero control voltage applied from the phase discriminator. It will be realized that any deviation in frequency between the two waves, which are nearly in synchronism, is effective as a progressive deviation in phase, and that, the phase being held constant, the frequencies are necessarily synchronous.

It will also be recognized that the variable delay circuit 17 can be placed in the supply to the discriminator from the oscillator equally as well as in the supply from the pick-up heads. Since both waves are unmodulated, a delay of one-half cycle is exactly equivalent to an advance of one-half cycle in phase, and an advance in the supply to the discriminator from the oscillator is tantamount to a delay in the supply from the pick-up heads. The actual location of the variable delay circuit is merely a matter of convenience.

An alternative source for the reference or stabilizing frequency to the discriminator is any one of the modulated waves picked up by the heads 3*a* to 3*n*. A circuit for deriving the timing wave from this source is shown as connected to the output of preamplifier 5*a*. This circuit connects through a decoupling resistor 31 to a resonant circuit of medium high Q; i. e., its damping is sufficiently low so that it will not respond materially to the changes in amplitude between successive crests, but is high enough to enable it to follow phase changes of flutter frequency. The latter tend to be sinusoidal in form. The frequencies involved and the amplitudes are both functions of the type of drive mechanism and the tape speed. The amplitudes, fortunately decrease as tape speed increases; the frequencies rise. With drives suitable for the equipment here considered it may be expected that the flutter will be at frequencies of the order of a few thousand cycles per second; low as compared to the 165 kc. norm. A fairly high Q circuit will respond to phase shifts of this character, but the actual design of this circuit will depend largely on the mechanical characteristics of the equipment with which it is to be used. The potentials developed across the resonant circuit are fed to a high gain amplifier 35. After amplification the signals are passed through a limiter. This may comprise a resistor 37, the output end of which is connected to ground through two oppositely poled rectifiers 39 and 39', each of which is biased, from a suitable source, to a limiting potenial. The limiter removes the last traces of modulation from the amplified waves. By throwing the switch 41 to the opposite position from that shown, the demodulated waves from the signal track are fed to the variable delay circuit 17 in place of those derived from the separate timing wave track. The results are identical with those obtained where a separate track is used.

It is even possible to use the modulated waves directly to feed the variable delay circuit and the phase discriminator (or the phase discriminator directly in case the delay circuit be located in some other part of the system). More uniform control, however, is obtained by using waves of constant amplitude and the latter practice is therefore to be preferred.

The waves derived from the record will have the same timing wave frequency, and will be equally subject to flutter whether they be derived from one of the signal tracks or from a separate timing track. The use of known types of drive will keep their average frequency constant, and, if desired, locked to the frequency of the normal A.-C. power supply. Mechanical or electrical methods of reducing the flutter of very minute amplitude and high frequency from either transverse or longitudinal vibration of the record itself, although ample for ordinary purposes, may not be sufficiently effective where amplitudes of 0.1 mil correspond to a microsecond's uncertainty as to timing, and pulses are occurring at the rate of 8 per microsecond; pulses which should be distinct and equally separated may be bunched or spread.

With the cut-off frequency of the filter circuit which feeds the reactance tube set at a value of several cycles of the timing wave—say 10 cycles, or about 6 microseconds—a shortening or lengthening of one cycle will have little effect on the oscillator frequency; oscillatory variations in the speed of the record will therefore cancel out and produce no material change in the time of sampling. Systematic changes, which do not cancel out within a very few cycles, however, are reflected as changes in oscillator frequency, but so gradually as not to affect the reproduced television pictures.

As has been indicated above there are many circuit modifications which may be employed in equipment of the character described without departing from the spirit of the invention. One of the reasons for using the block form of diagram in illustrating the invention is that so many modifications are available to perform the appropriate functions and where specific circuitry is shown it is for illustrative purposes only and is not intended as a limitation upon the scope of the following claims.

I claim:

1. In a system for reconstructing television signals from phonographic-type records whereon said signals are recorded as a plurality of parallel tracks representing phase-displaced wave trains of a common timing frequency, successive cycles of each train being modulated by non-successive samplings of the signal to be reproduced and successive samplings of said signal being modulated on different trains; a plurality of translating heads adapted to engage said tracks to reproduce said wave trains substantially as recorded, an oscillation generator tuned approximately to said timing-wave frequency, means for comparing the phase of waves produced by said oscillator with the phase of the reproduced wave trains and producing an error signal proportioned to phase discrepancies therebetween, means for applying said error signal to correct the phase of said oscillator-produced waves to maintain a constant average relation with respect to the phases of said reproduced wave trains, means for deriving from said oscillator-produced waves a plurality of pulse trains relatively displaced in phase in manner corresponding to the phase displacement of the signal-modulated wave trains, and means for applying said pulses to sample the crest voltages of the corresponding wave trains to reconstruct the original signal.

2. Apparatus in accordance with claim 1 wherein said means for comparing the phase of said generator produced waves with the phase of said reproduced waves comprises means for removing the modulating components from a portion of at least one of said modulated wave trains to provide an unmodulated wave of said common timing frequency, and a phase discriminator connected to said removing means and said generator.

3. Apparatus in accordance with claim 1 wherein said means for comparing the phase of said generator produced waves with the phase of said reproduced waves comprises an additional translating head adapted to engage a separate track representative of an unmodulated wave of said common timing frequency, and a phase discriminator connected to receive signals from said additional head and said generator.

References Cited in the file of this patent

UNITED STATES PATENTS

| Number | Name | Date |
|---|---|---|
| 1,771,360 | Thurm | July 22, 1930 |
| 1,867,542 | Hammond | July 12, 1932 |
| 1,974,911 | Buecker et al. | Sept. 23, 1934 |
| 2,427,421 | Rieber | Sept. 16, 1947 |
| 2,517,808 | Sziklai | Aug. 8, 1950 |

FOREIGN PATENTS

| Number | Country | Date |
|---|---|---|
| 832,168 | France | June 27, 1938 |